United States Patent [19]

Keshav

[11] Patent Number: 5,864,605
[45] Date of Patent: *Jan. 26, 1999

[54] VOICE MENU OPTIMIZATION METHOD AND SYSTEM

[75] Inventor: Srinivasan Keshav, Berkeley Heights, N.J.

[73] Assignee: AT&T Corp, Middletown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 701,601

[22] Filed: Aug. 22, 1996

[51] Int. Cl.$^6$ .............................. H04M 1/64; H04M 11/00
[52] U.S. Cl. ..................... 379/88.01; 379/67.1; 379/76; 379/88.04; 379/88.08; 379/88.22; 379/93.29; 379/93.34
[58] Field of Search ................................... 379/67, 88, 89, 379/67.1, 76, 88.04, 88.08, 88.22, 93.29, 93.34, 88.01

[56] References Cited

U.S. PATENT DOCUMENTS

| | | |
|---|---|---|
| 4,763,356 | 8/1988 | Day, Jr. et al. ........................ 379/368 |
| 5,027,384 | 6/1991 | Morganstein .............................. 379/67 |
| 5,222,125 | 6/1993 | Creswell et al. .......................... 379/67 |
| 5,357,562 | 10/1994 | Metser et al. ............................. 379/97 |
| 5,381,461 | 1/1995 | Baals et al. ............................... 379/96 |
| 5,412,713 | 5/1995 | Baals et al. ............................... 379/96 |

*Primary Examiner*—Krista Zele
*Assistant Examiner*—Allan Hoosain

[57] ABSTRACT

A method and system adaptively substitutes a single dialing button sequence for a selected action in a voice menu of a telephone system. A shortcut message in the voice menu prompts a caller to select a shortcut button to achieve a shortcut action. The system then accumulates counts related to frequencies of occurrence of a plurality of actions prompted by the voice menu. The system then ranks the plurality of actions by their respective accumulated counts and determines if any one of the plurality of actions has an accumulated count greater than an accumulated count of the shortcut action. If it does, then the system causes the substitution the one of the plurality of actions and a corresponding message for the shortcut action and the shortcut message in the voice menu.

24 Claims, 15 Drawing Sheets

FIG. 6

MENU MESSAGE TABLE (230)

| | BUTTON SEQUENCE | | | FIRST VOICE STRING | SECOND VOICE STRING |
|---|---|---|---|---|---|
| | A | B | C (LAST PRESSED) | | |
| 1M | | | 1 | "FOR FIRE INSURANCE" | "SELECT BUTTON 1" |
| 2M | | | 2 | "FOR LIFE INSURANCE" | "SELECT BUTTON 2" |
| 3M | | | 3 | "FOR AUTO INSURANCE" | "SELECT BUTTON 3" |
| 9M | | | 9 | "TO SPEAK TO ANY AVAILABLE AGENT" | "SELECT BUTTON 9" |
| 31M | | 3 | 1 | "TO CHECK YOUR COVERAGE" | "SELECT BUTTON 1" |
| 32M | | 3 | 2 | "TO REPORT A CLAIM" | "SELECT BUTTON 2" |
| 33M | | 3 | 3 | "TO BUY A NEW POLICY" | "SELECT BUTTON 3" |
| 311M | 3 | 1 | 1 | "TO COMPARE PREMIUM RATES" | "SELECT BUTTON 1" |
| 312M | 3 | 1 | 2 | "TO HEAR ABOUT NEW FEATURES" | "SELECT BUTTON 2" |
| 313M | 3 | 1 | 3 | "TO TALK WITH YOUR AGENT" | "SELECT BUTTON 3" |

FIG. 6A

MENU MESSAGE TABLE (230)

| BUTTON SEQUENCE | | LAST PRESSED | FIRST VOICE STRING | SECOND VOICE STRING | |
|---|---|---|---|---|---|
| A | B | C | | | |
| | | 1 | "FOR FIRE INSURANCE" | "SELECT BUTTON 1" | 1M |
| | | 2 | "FOR LIFE INSURANCE" | "SELECT BUTTON 2" | 2M |
| | | 3 | "FOR AUTO INSURANCE" | "SELECT BUTTON 3" | 3M |
| | | 9 | "FOR AUTO INSURANCE AND TO CHECK YOUR COVERAGE AND TO COMPARE PREMIUM RATES" | | 9M |
| | 3 | 1 | "TO CHECK YOUR COVERAGE" | "SELECT BUTTON 9" | 31M |
| | 3 | 2 | "TO REPORT A CLAIM" | "SELECT BUTTON 1" | 32M |
| | 3 | 3 | "TO BUY A NEW POLICY" | "SELECT BUTTON 2" | 33M |
| 3 | 1 | 1 | "TO COMPARE PREMIUM RATES" | "SELECT BUTTON 3" | 311M |
| 3 | 1 | 2 | "TO HEAR ABOUT NEW FEATURES" | "SELECT BUTTON 1" | 312M |
| 3 | 1 | 3 | "TO TALK WITH YOUR AGENT" | "SELECT BUTTON 2" | 313M |

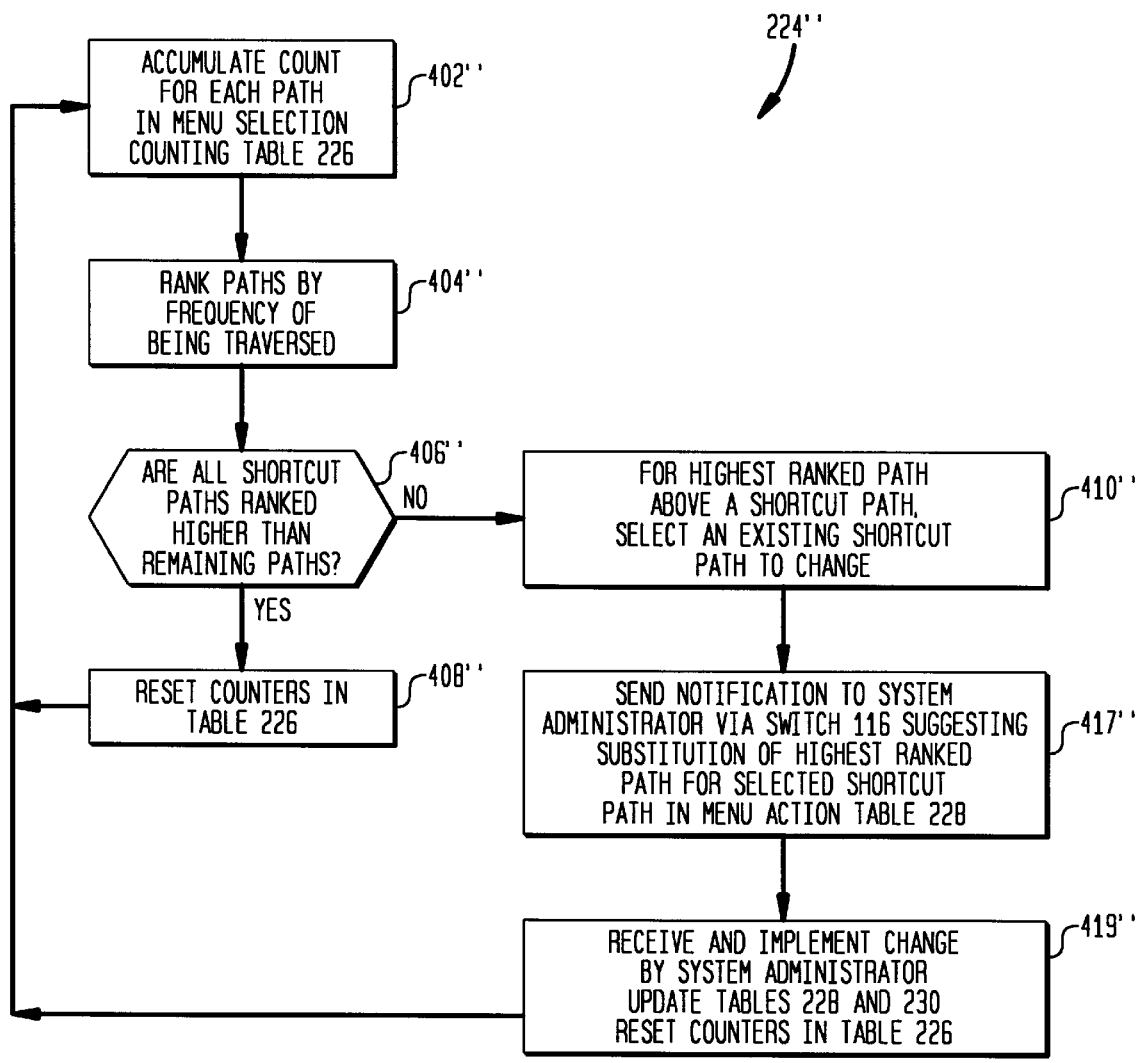

5,864,605

VOICE MENU OPTIMIZATION METHOD AND SYSTEM

TECHNICAL FIELD

The invention broadly relates to voice response subsystems in telecommunications networks and more particularly relates to methods and systems for optimizing voice menus for telecommunications systems.

BACKGROUND OF THE INVENTION

In existing telephone systems, whether in a private branch exchange or in a large scale telecommunications network, voice response units are employed to enable a caller to select from a touchtone dial button pad, actions from a voice menu based in the network. Sometimes, voice menus are referred to as touchtone menus, since the dialing button pad is typically a touchtone key pad. Voice menus have employed nested menus which are accessed by the caller pressing a sequence a buttons in response to a sequence of voice response messages or prompts. The voice response messages can be used to obtain help desk services, for example, to direct the caller to particular actions or to particular agents or attendants sought by the caller. Callers tend to follow standard paths through the voice menus, for example, callers to a help desk seeking a particular service, will repeat the same sequence of touchtone buttons to obtain the desired service. It would be desirable to have a method and system which would adaptively reconfigure the voice menus so that popular sequences of touchtone buttons used by many callers can be reconfigured into a single shortcut button to obtain the desired action or attendant service.

SUMMARY OF THE INVENTION

The invention disclosed herein solves this need in the prior art. A system and method are disclosed for a voice menu optimization. A control processor associated with a PBX or associated with a network switch in a telecommunications network, is used to control a menu voice response unit. Included in the control processor is a menu message table to store a current set of menu messages which correspond to sequences of touchtone buttons which are pressed by a caller. Also stored in the control processor is a menu action table which contains the actions desired by a caller such as directing a call to an announcement voice response unit, or to an attendant or agent, or to other network switches in the telecommunications network. The menu message table and the menu action table embody the voice menu. Also included in the control processor is a menu selection counting table which accumulates counts for each action made by all of the callers accessing the voice menu. Also contained in the control processor is a voice menu optimization program which performs the method of the invention in conjunction with the menu voice response unit. The voice menu optimization program controls the accumulation of counts for each action in the menu selection counting table. It then ranks the actions by their frequency of occurrence of being invoked by callers. One or more touchtone buttons is identified as shortcut buttons which provide a single button to be pressed in order to invoke a shortcut action. The voice menu optimization program determines if all of the shortcut actions are ranked higher in frequency of occurrence than the remaining actions which are invoked by multiple button sequences. If all shortcuts are ranked higher, then the counters in the menu selection counting table are reset and the accumulation counts for each action is resumed. Alternately, if there is a highest ranked action requiring multiple button depressions, which has a frequency of occurrence greater than an existing shortcut action, then an existing shortcut action is selected to be changed.

There are two embodiments of the invention. In the first embodiment, the optimization program sends a notice to the system administrator that a change should be made to the existing shortcut action. In the second embodiment, the optimization program makes the change. This is done by substituting the highest ranked multiple button sequence action for the selected shortcut action in the menu action table. For convenience, the button sequence is characterized as "ABC" for a three button sequence necessary to select the action. If the highest ranked action is invoked by an "ABC" button sequence, this action is substituted for a shortcut action in the menu action table. A concatenated string of messages is formed from the first voice strings of the messages in the message sequence "ABC". Each message in the voice response unit is composed of a first voice string which identifies the selected path, and a second voice string which identifies the button to be pressed to move along the selected path. These messages are played by the menu voice response unit to the caller. The formation of a concatenated string from these first voice strings is for the button sequences beginning with the first pressed button "C", followed by the word "and", followed by the second first voice string for the second button in the sequence which is "BC", followed by the word "and", followed by the last occurring first voice string for the last occurring message "ABC". This concatenated string is substituted for the existing first voice string of the selected shortcut action in the menu message table. Thereafter, if the shortcut button is selected by a caller, the concatenated string of first voice strings will be played together followed by the second voice string for the shortcut action. This will enable the system to adapt to many callers repetitively actuating the same touchtone button sequence for a particular desired action. After the concatenated string is substituted in the menu message table, the voice menu optimization program resets the counters and the menu selection counting table and resumes the accumulation of counts for each action. In this manner, the control processor and menu voice response unit can adaptively change the configuration of the voice menus in response to the frequency of occurrence of particular button sequences actuated by callers to the system.

In an alternate embodiment of the invention, counters are associated with the path nodes of the voice menu, to identify frequently used paths that can be circumvent by assigning a shortcut button.

DESCRIPTION OF THE FIGURES

The many features and advantages of the invention can be more fully appreciated with reference to the accompanying figures.

FIG. 6 illustrates the menu message table responding to FIGS. 4A and 4B.

FIG. 6A illustrates the menu message table corresponding to 4C and 4D.

FIG. 11 is a flow diagram of the alternate embodiment shown in FIGS. 9 and 10.

DISCUSSION OF THE PREFERRED EMBODIMENTS

Figure 1:
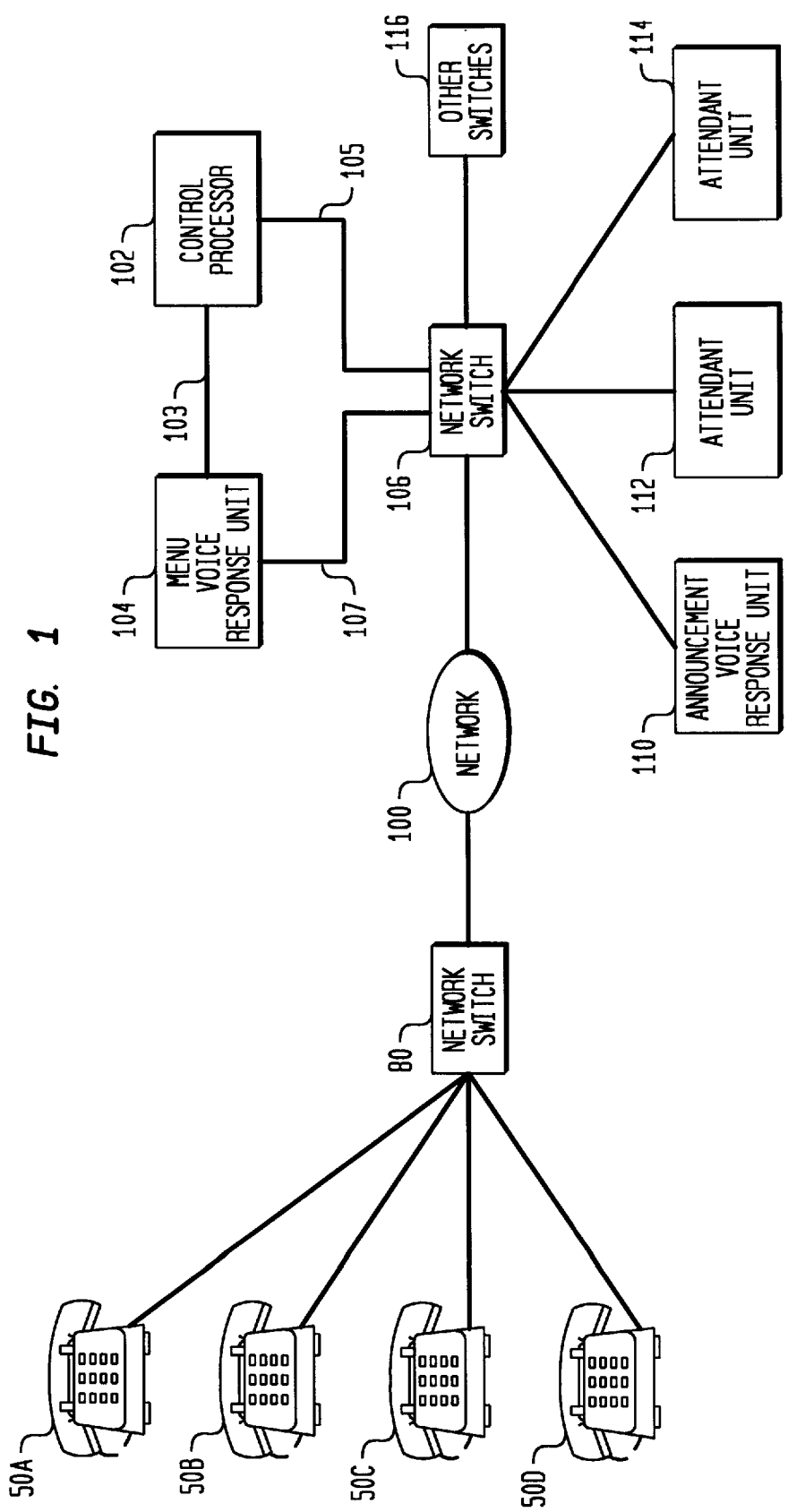
FIG. 1 is a system block diagram of a telecommunications network using the invention.

FIG. 1 illustrates a system block diagram of telecommunications network which includes the invention. Touchtone telephones 50A, 50B, 50C and 50D are connected to the network switch 80. Each of the telephones 50A, etc., has a touchtone button pad consisting of twelve buttons numbered in rows 1–3, 4–6, 7–9 and *0#. The network switch 80 is connected through the network 100 to the network switch 106. The network switch 106 is controlled by the control processor 102 over the line 105. Control processor 102 also controls the menu voice response unit 104 over the line 103. The menu voice response unit 104 is connected by line 107 to the network switch 106.

The touchtone pad for a telephone such as telephone 50A will typically have some of the buttons such as the buttons used for touchtone button sequences and others of the buttons such as the buttons 7–9 used as shortcut buttons. The buttons 1–6 can be used to establish paths through a voice menu which is stored in a control processor 102, in order to invoke a corresponding sequence of voice responses from the menu voice response unit 104. The control processor 102 will have actions invoked in response to the sequences of buttons pressed by a caller to cause the network switch 106 to connect the caller to either an announcement voice response unit 110, or attendant at an attendant unit 112 or an attendant unit 114, or alternately to direct the caller's call to other switches 116 in the network.

Figure 2:
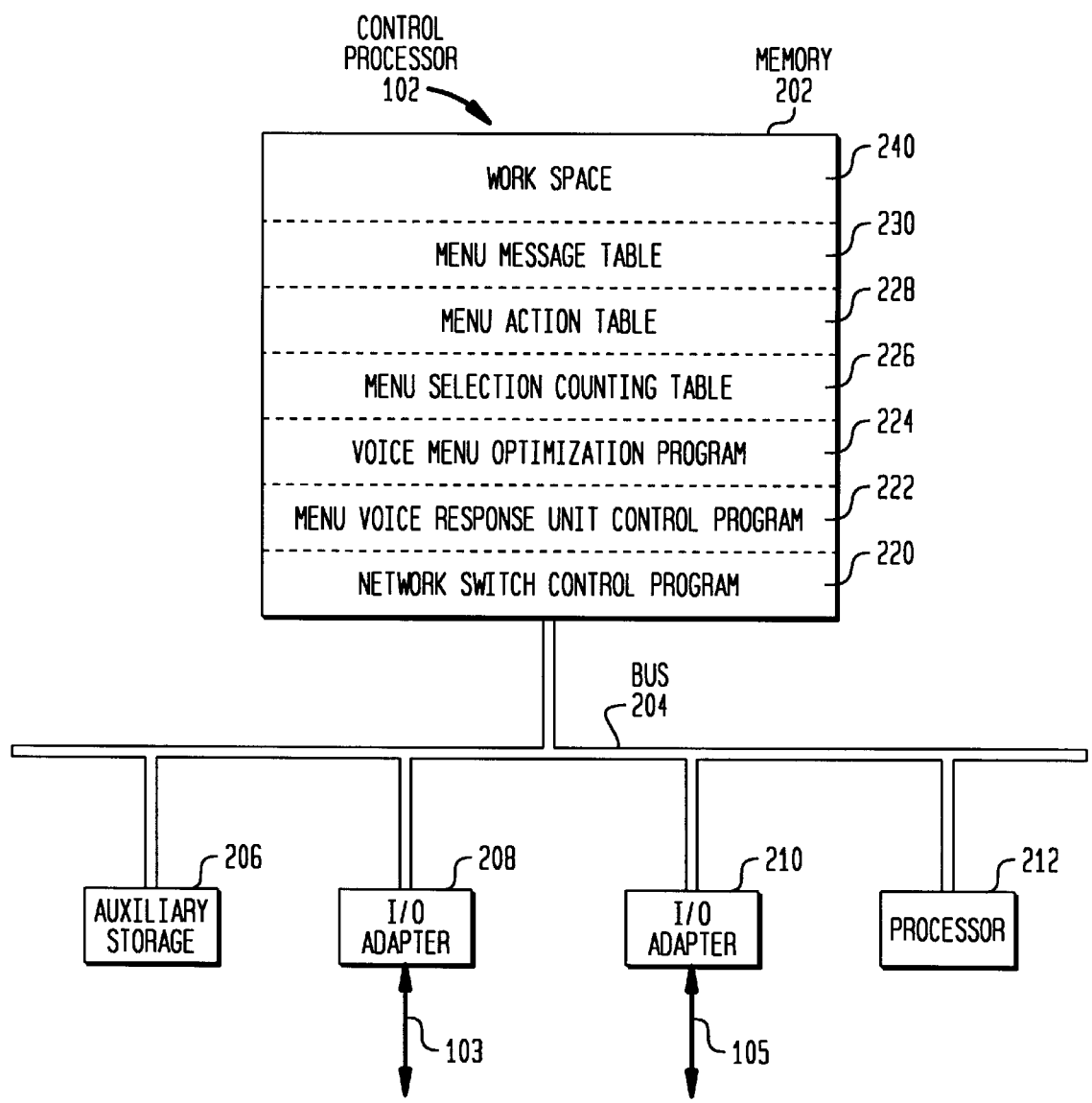
FIG. 2 is a functional block diagram of the control processor.

FIG. 2 illustrates the control processor 102 in greater detail. The control processor 102 includes the memory 202, connected by the bus 204 to the auxiliary storage 206, the I/O adapter 208, the I/O adapter 210, and the processor 212. The I/O adapter 208 connects the control processor 102 over the line 103 to the menu voice response unit 104. The I/O adapter 210 connects the control processor 102 over the line 105 to the network switch 106.

Figure 3:
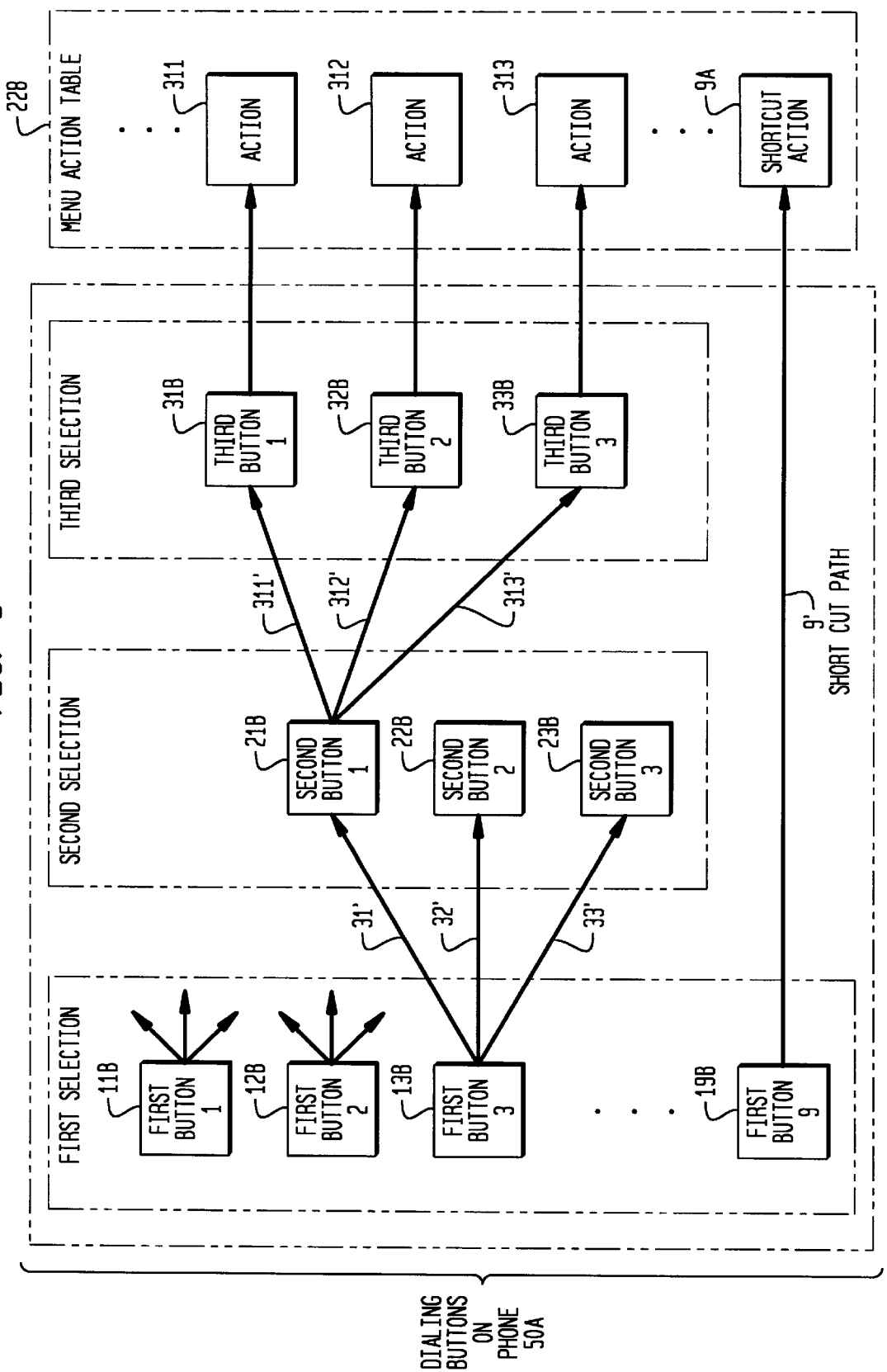
FIG. 3 illustrates the selection paths invoked by depressing a sequence of dialing buttons on a touchtone pad of a telephone, and the corresponding action invoked at the control processor.

Stored in the memory 202 of the control processor 102 is a network switch control program 220 which controls the network switch 106. Also stored in the memory 202 is the menu voice response unit control program 222 which controls the menu voice response unit 104. Also stored in the memory 202 is the voice menu optimization program 224, represented by the flow diagram in FIG. 7. Also stored in the memory 202 is the menu selection counting table 226, which is illustrated in greater detail in FIG. 5. Also stored in memory 202 is the menu action table 228 which is illustrated in FIGS. 3, 4B and 4D. Also stored in the memory 202 is the menu message table 230 which is illustrated in FIGS. 4A–4D and in FIGS. 6 and 6A. The remaining portion of the memory 202 can be dedicated to workspace 240 and can also include operating system programs, I/O device drivers, and other supporting programs.

FIG. 3 illustrates example paths through a voice menu in response to pressing the buttons on the telephone 50A, for example. FIG. 3 illustrates the paths in response to a first selection of one of the buttons on the touchtone pad of phone 50A. The example shown is the caller pressing button 3 designated by the reference number 13B, as a first selection. The caller has pressed button 3 in response to a first voice response message. In pressing button 3 the caller receives a second menu of voice response messages and makes a second selection, this time pressing button number 1 which is designated 21B in FIG. 3. In response to pressing button 21B, a third voice response message is presented to the caller and in response to this the caller presses button 1 this time labeled 31B in FIG. 3. As a consequence of having pressed button 31B, the action 311 has been invoked in the menu action table 228 in FIG. 3. The caller could have selected a shortcut button as the first selection in response to the first message from the voice response unit. In the example of FIG. 3, button 9 labeled 19B is a shortcut button and establishes the shortcut path 9' to the shortcut action 9A in FIG. 3. The paths for the voice menu shown in FIG. 3 are designated by the button numbers at the beginning and end of each path. For example, pressing button 3 labeled 13B as a first selection followed buy pressing button 1 labeled 21B as a second selection will establish a voice menu path 31'. If instead, the caller had pressed button 3 labeled 13B followed by button 2 labeled 22B in FIG. 3, then the voice menu path 32' would have been established. Still further, if the caller had pressed the three button sequence and button 3 for the first button followed by button 1 for the second selection for by button 1 for the third selection, then the path 31' followed by the path 311' will have been followed in FIG. 3. This path sequence leads to the action 311 in the menu action table 228 of FIG. 3.

Figure 4A:
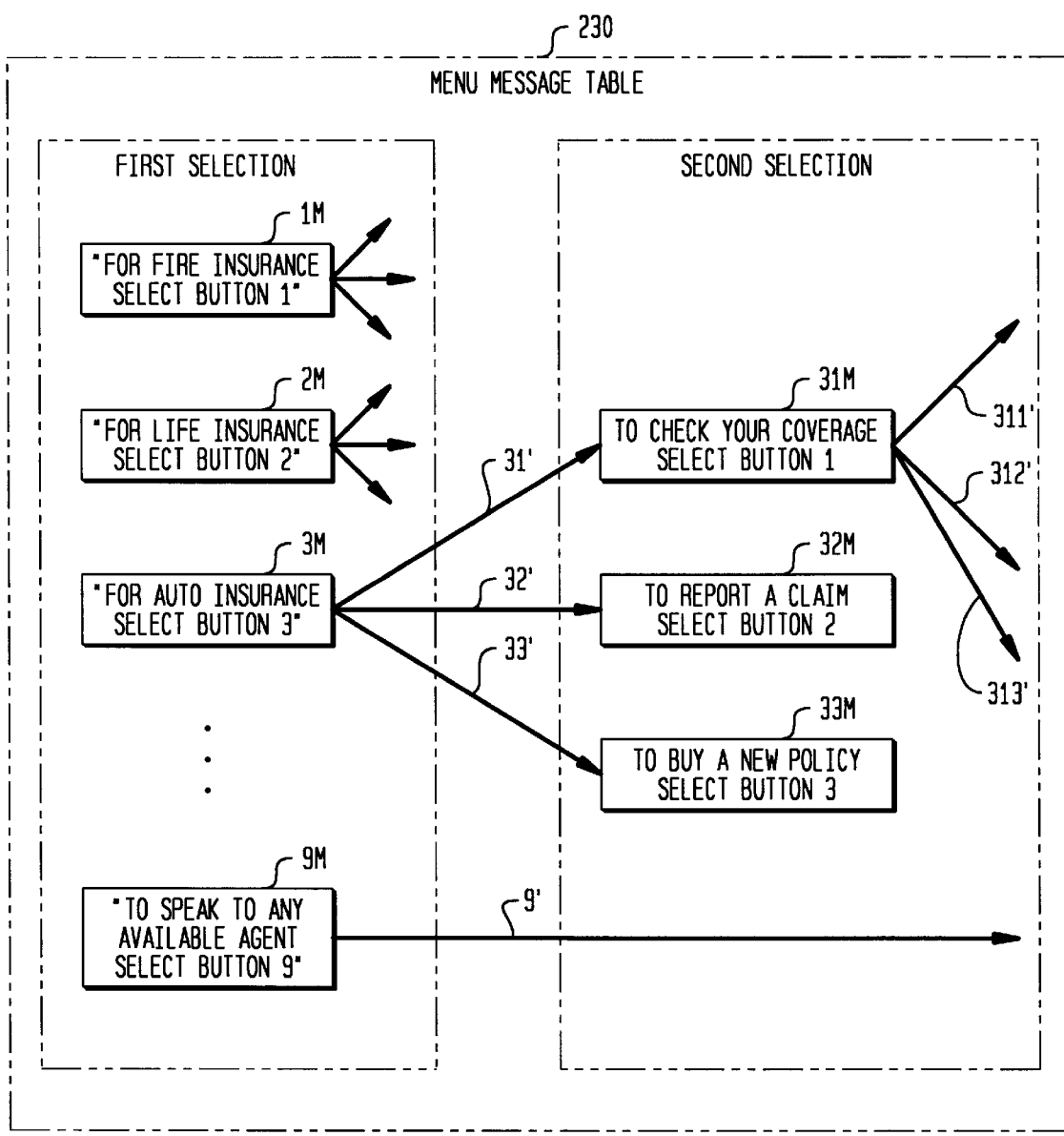
FIG. 4A and FIG. 4B illustrate the menu message table and the menu action table in an initial stage.
Figure 4B:
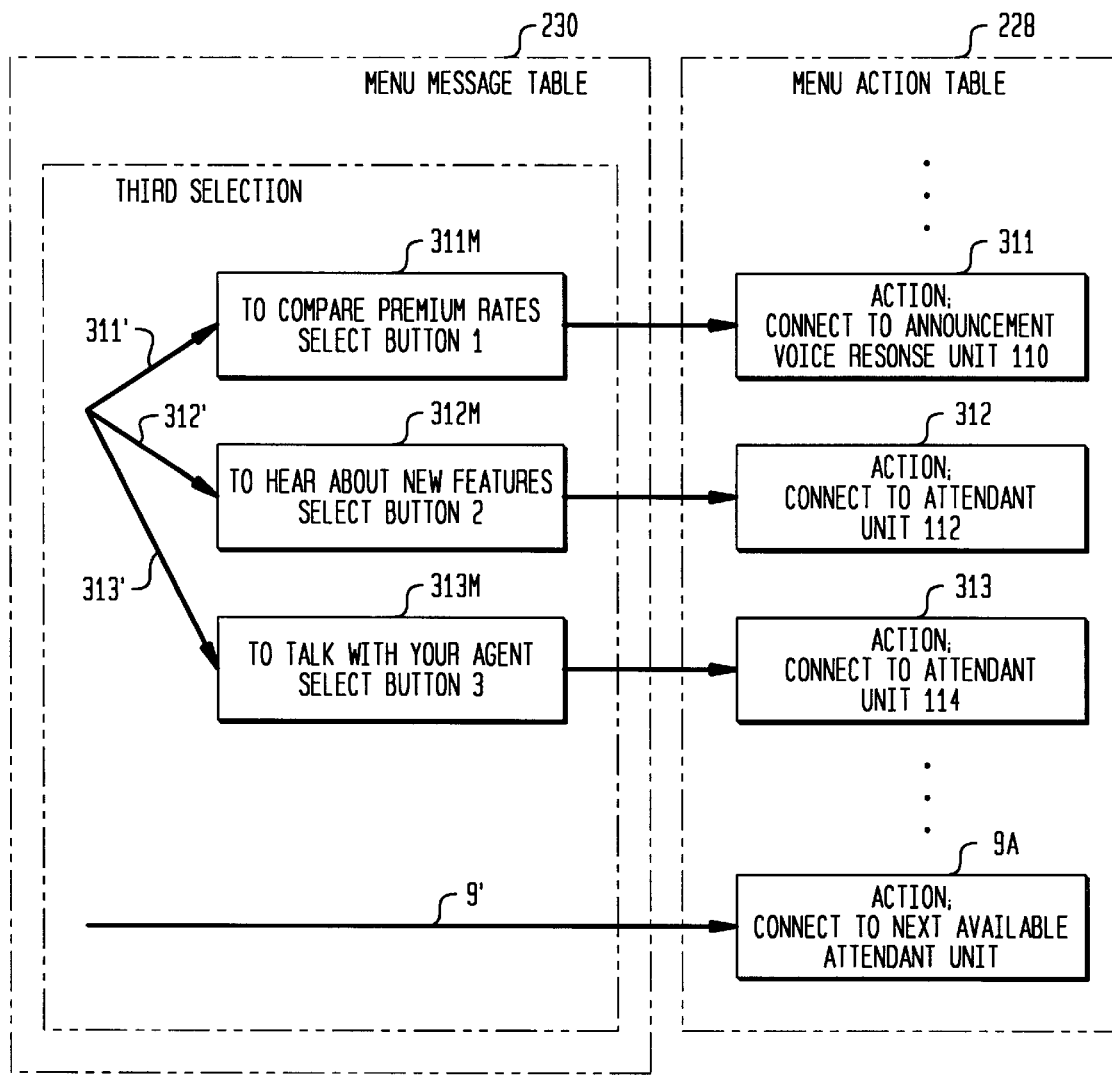
Figure 4C:
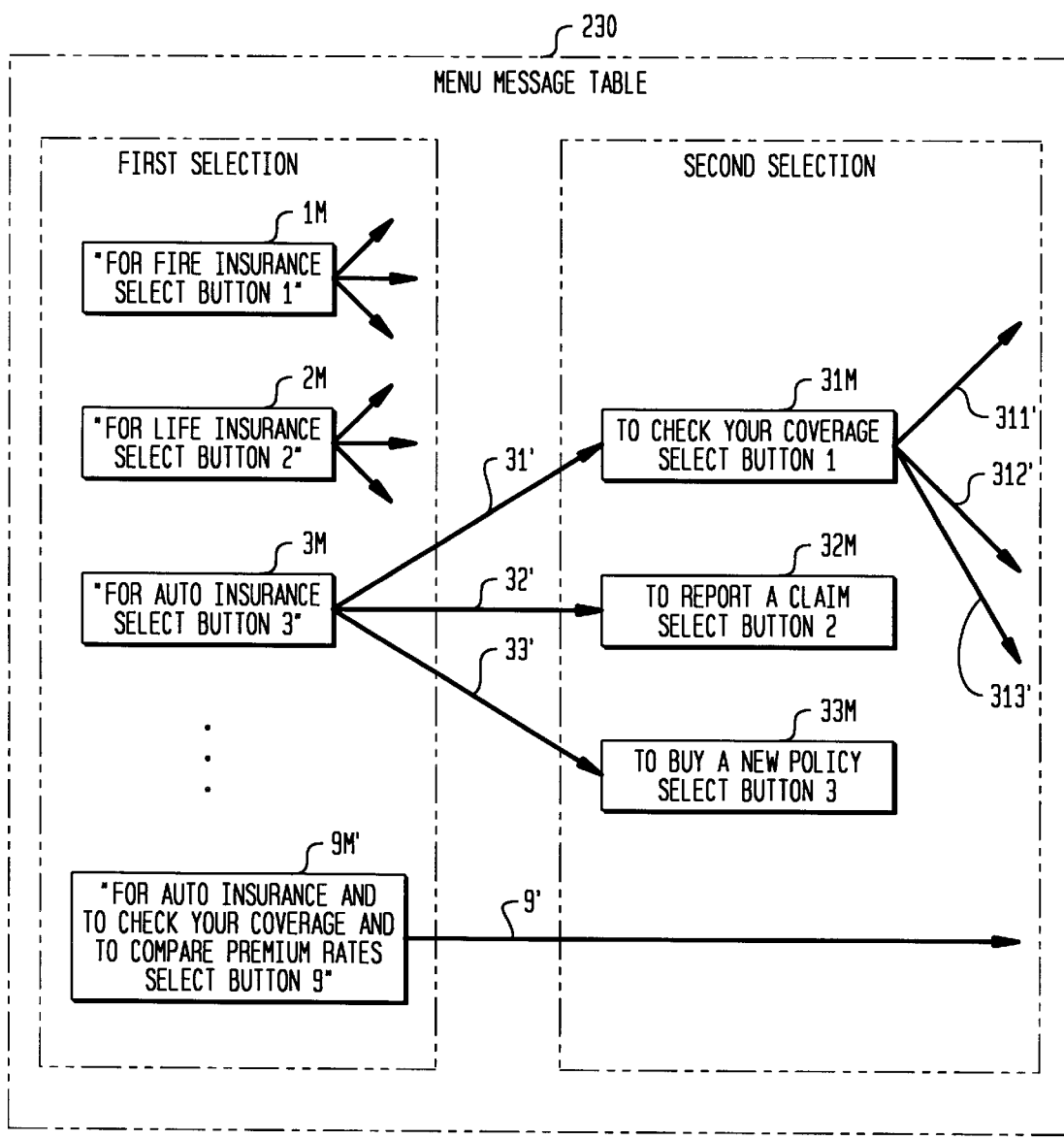
FIG. 4C and FIG. 4D illustrate the menu message table and menu action table at a stage after the operation of the invention.
Figure 4D:
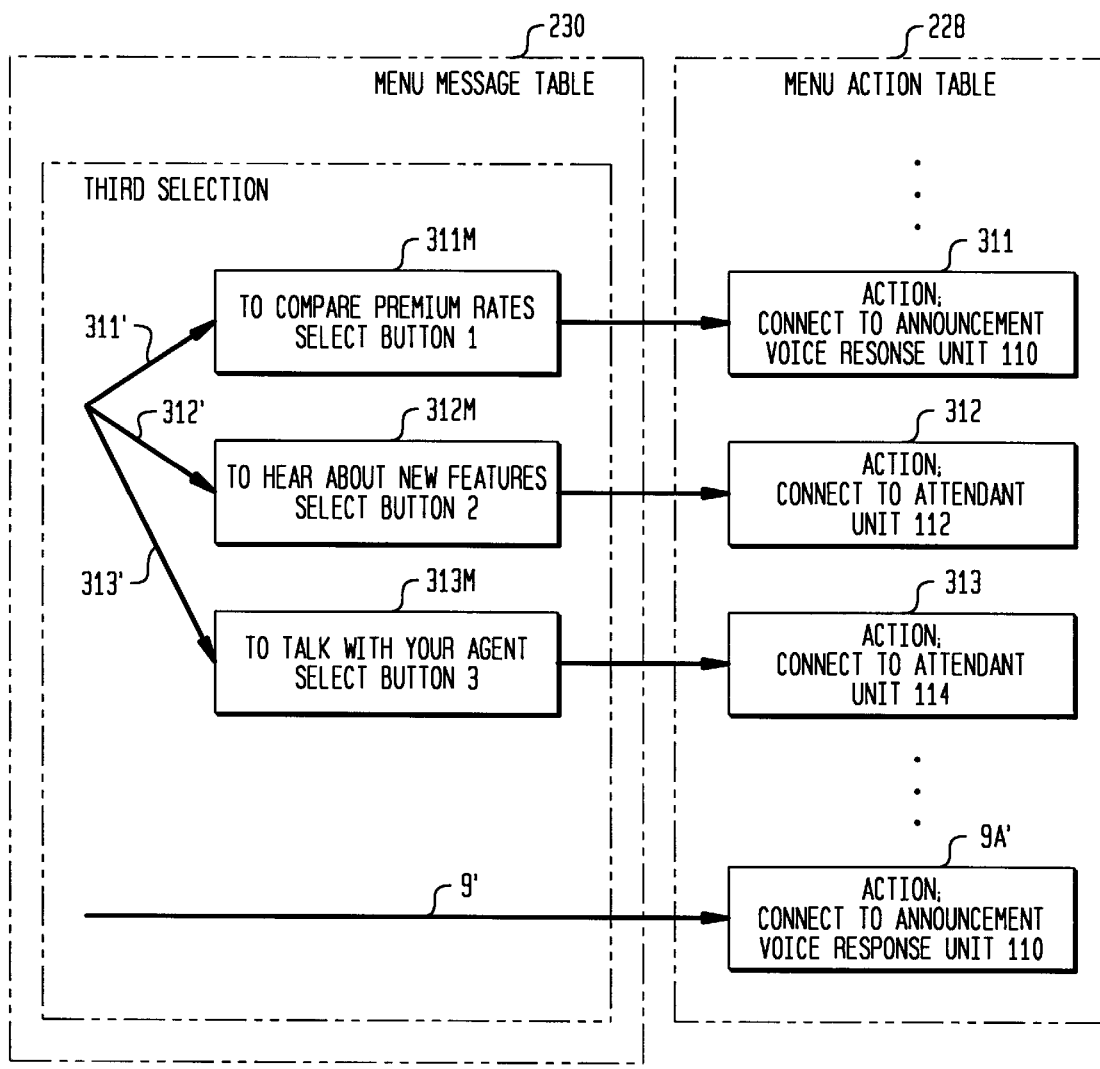

Turning now to FIG. 4A, the figure illustrates the state of the menu message table 230 and the menu action table 228 in a first stage of an example voice menu, prior to the operation of the invention. As is seen in FIG. 4A and FIG. 4B, the example is for a voice response menu used by an insurance company for the benefit of callers seeking information and direction to called agents and attendants at the insurance company. In the example, the insurance company offers three types of insurance—fire, life and auto. The voice menu is organized as is shown in FIGS. 4A and 4B, to guide a caller to obtain information from either an announcement voice response unit 110 or from attendant units 112 or 114 or to direct the call to other switches 116. This is accomplished in response to the caller pressing of a prescribed sequence of touchtone buttons in response to voice prompts from the menu voice response unit based, which are on the menu message table 230 and the menu action table 228. When the caller initially places the call to the control processor 102 and menu voice response unit 104, a first menu message is played back to the caller to indicate which buttons begin each respective path in FIG. 4A. The caller will be prompted with the following four message prompts:

Message 1M states "For fire insurance select button 1".

Message 2M states "For life insurance select button 2".

Message 3M states "For Auto insurance select button 3".

Message 9M states "To speak to any available agent select button 9".

FIG. 4A shows that if the caller selects button 3 on the touchtone pad, the caller is presented with a second menu of three options by the menu voice response unit 104. The three menu options are played back as follows:

Message 31M states "To check your coverage select button 1".

Message 32M states "To report a claim select button 2".

Message 33M states "To buy a new policy select button 3".

The example shown in FIG. 4A indicates that the caller has selected button 1 in the second selection. In making this second button selection, the path 31' is established. FIG. 4A and FIG. 4B show that after having selected button 1 in response to message 31M, the caller is presented with a third voice menu with these options for making a third button selection. The third voice menu is played back by the menu voice response unit as follows:

Message 311M states "To compare premium rates select button 1".

Message 312M states "To hear about new features select button 2".

Message 313M states "To talk with your agent select button 3".

The example in FIG. 4B shows that if button 1 is selected as the third selection, this establishes the path 311'. If button 2 is selected as the third selection, then this establishes the path 312'. If button 3 is selected as the third selection, then this establishes path 313'.

In FIG. 4B, the actions shown in the menu action table correspond to the last selection made by the caller in the menu message table 230. If the caller selects button 1 as his third selection response to message 311M, then action 311 is invoked in menu action table 228 which connects the caller to the voice response unit 110. Alternately, if the caller's last selection is button 2 in response to message 312M, then action 312 is invoked in the menu action table 228, which connects the caller to the attendant unit 112. Alternately, if the caller selected button 3 in response to message 313M, then action 313 is invoked in the menu action table 228, connecting the caller to attendant unit 114. Alternately, if the caller chose to execute the shortcut path 9' in response to the first message 9M played back by the voice response unit, "To speak to any available agent select button 9", the menu message table 230 would immediately move over shortcut path 9' to the menu action table 228 and shortcut action 9A which would connect the caller to the next available attendant unit.

Figure 5:
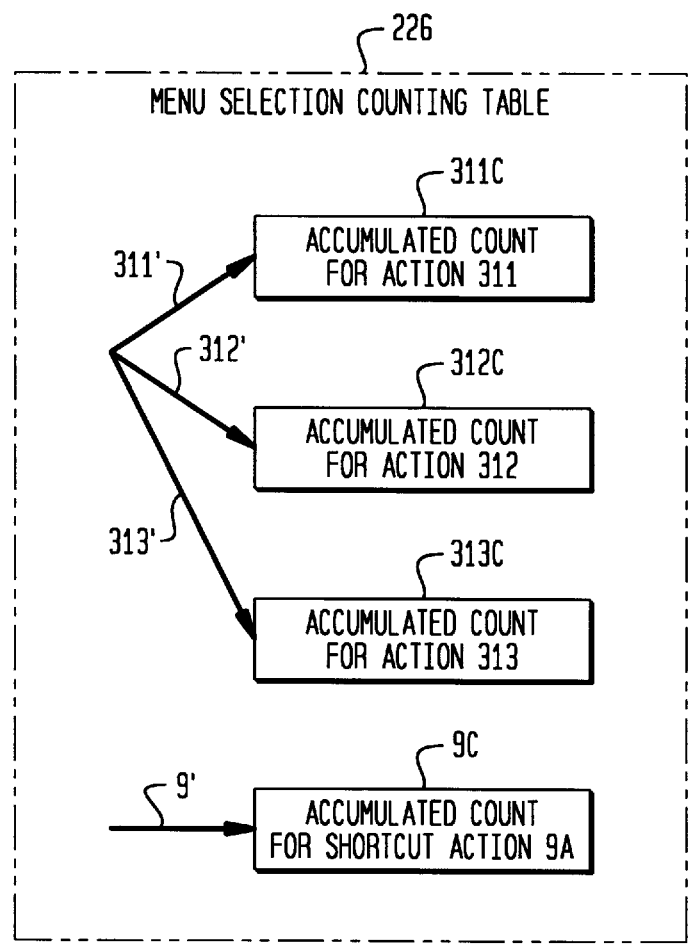
FIG. 5 illustrates the menu selection counting table.

In accordance with the invention, the menu selection counting table 226 of FIG. 5 counts and accumulates the counts for the actions invoked in the menu action table 228. The counter 311C accumulates counts for the action 311. The counter 312C accumulates the counts for the action 312. Similarly for counter 313C accumulates the counts for action 313. The counter 9C accumulates the counts for the shortcut action 9A. This is done under the control of the voice menu optimization program 224 of FIG. 7.

A detailed illustration of the menu message table 230 in FIG. 6 corresponds to the first stage of the example in FIGS. 4A and 4B. In FIG. 6 it is shown that each respective message is composed of two parts, a first voice string and a second voice string. For example, the message 3M which is "For auto insurance select button 3" is composed of a first voice string which is "For auto insurance" and a second voice string which is "Select button 3". The button sequence for each respective message is also shown with the last pressed button being C, the second to last button pressed being B, and the third to last button being A. For example, the message 311M, 312M, and 313M are invoked by the button sequence of button 3 followed by button 1. If the caller then presses button 1 again, in response to the message 311M "To compare premium rates select button 1", then the button sequence is A=3, B=1, and C=1. Action 311 will be invoked as a result.

Figure 7:
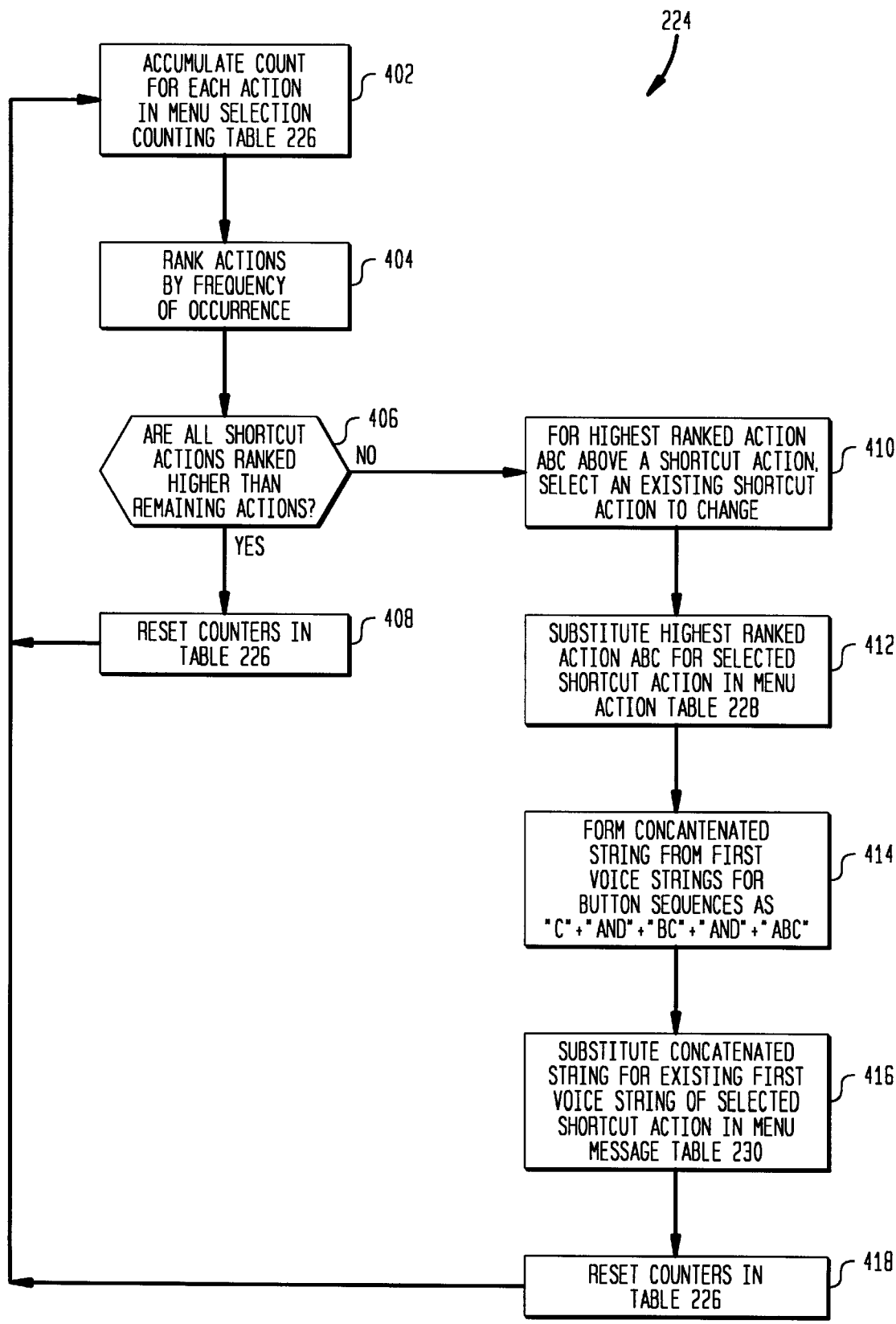
FIG. 7 is a flow diagram of the sequence of operational steps carried out by the voice menu optimization program in accordance with a first embodiment of the invention.

Turning now to the flow diagram of FIG. 7, the voice menu optimization program 224 is illustrated for a first embodiment of the invention. The program 224 is embodied as a sequence of executable instructions stored in the memory 202 of the control processor 102, which when executed by the processor 212, carry out the function illustrated in the steps of the flow diagram of FIG. 7. Step 402 begins with accumulating the count for each action in the menu selection counting table 226. Then step 404 ranks the actions by their frequency of occurrence. Then step 406 determines if all shortcut actions are ranked higher than the remaining actions. If they are, then the flow passes to step 408. If they are not, then the flow steps to step 410. In step 408, if all shortcut actions are ranked higher than the remaining actions, the counters are reset in the menu selection counting table 226 and the program returns to the accumulation step 402. Alternately, if there is a highest ranked action which is designated by its button sequence ABC, whose frequency of occurrence is greater than any shortcut action, such as action 9A, then in step 410 an existing shortcut action is selected to be changed. In the example shown in FIGS. 4C, 4D and 6A, the shortcut action 9A is changed. The flow then passes to step 412 which substitutes the highest ranked action ABC for the selected shortcut action 9A in the menu action table 228. Then in step 414, a concatenated string is formed from the first voice strings for the button sequences as "C"+"AND"+"BC"+ "AND"+"ABC". The example shown in FIG. 6A for the message 9M' is "For auto insurance and to check you coverage and to compare premium rates" is the concatenated string formed for the first voice string of message 9M'. The first voice string is formed from messages 3M, 31M and 311M. Then the flow diagram of FIG. 7 passes to step 416 which substitutes the concatenated string for the existing first voice string of the selected shortcut action in the menu message table 230. This is the first voice string for message 9M' in FIG. 6A. Then flow diagram passes to step 418, which resets the counters in table 226 and returns to the accumulation step 402.

Figure 8:
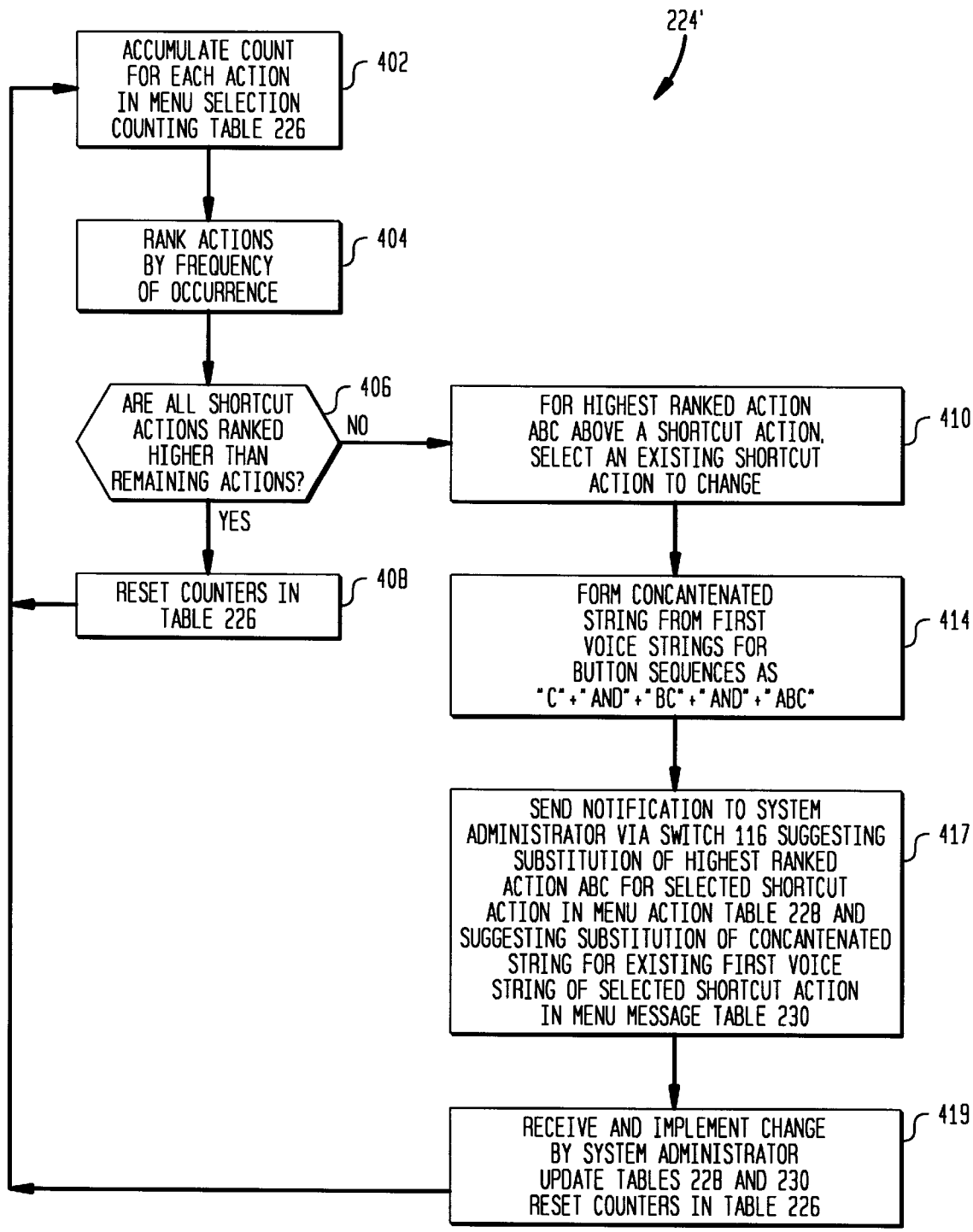
FIG. 8 is a flow diagram of the sequence of operational steps carried out by the voice menu optimization program in accordance with a second embodiment of the invention.

FIG. 8 is a flow diagram of a second embodiment of the invention, showing an alternate voice menu optimization program 224". Steps 402, 404, 406, 408, and 410 are the same as in FIG. 7. Step 410 then flows to step 414, which is the same as in FIG. 7. Step 414 then flows into step 417, where notification is sent to the system administrator via switch 116, for example, suggesting a substitutions for the shortcut action in menu action table 228. The notification can also suggest a substitution for the voice string of the selected shortcut action in menu message table 230. Step 417 then flows to step 419 which receives and implements the change ordered by the system administrator in response to the notification in step 417. The received change order is used to update tables 228 and 230. The system administrator can adopt the changes suggested by the menu optimization program 224' or the administrator can order alternate changes to other shortcut actions of or to other voice strings. The counters in table 226 are then reset and the program returns to accumulation step 402.

The resulting invention enables the adaptive optimization of the voice menu controlled by the control processor in the menu voice response unit 104, in response to monitoring the frequency of occurrence of particular button actuated by callers to the control processor 102.

Figure 9:
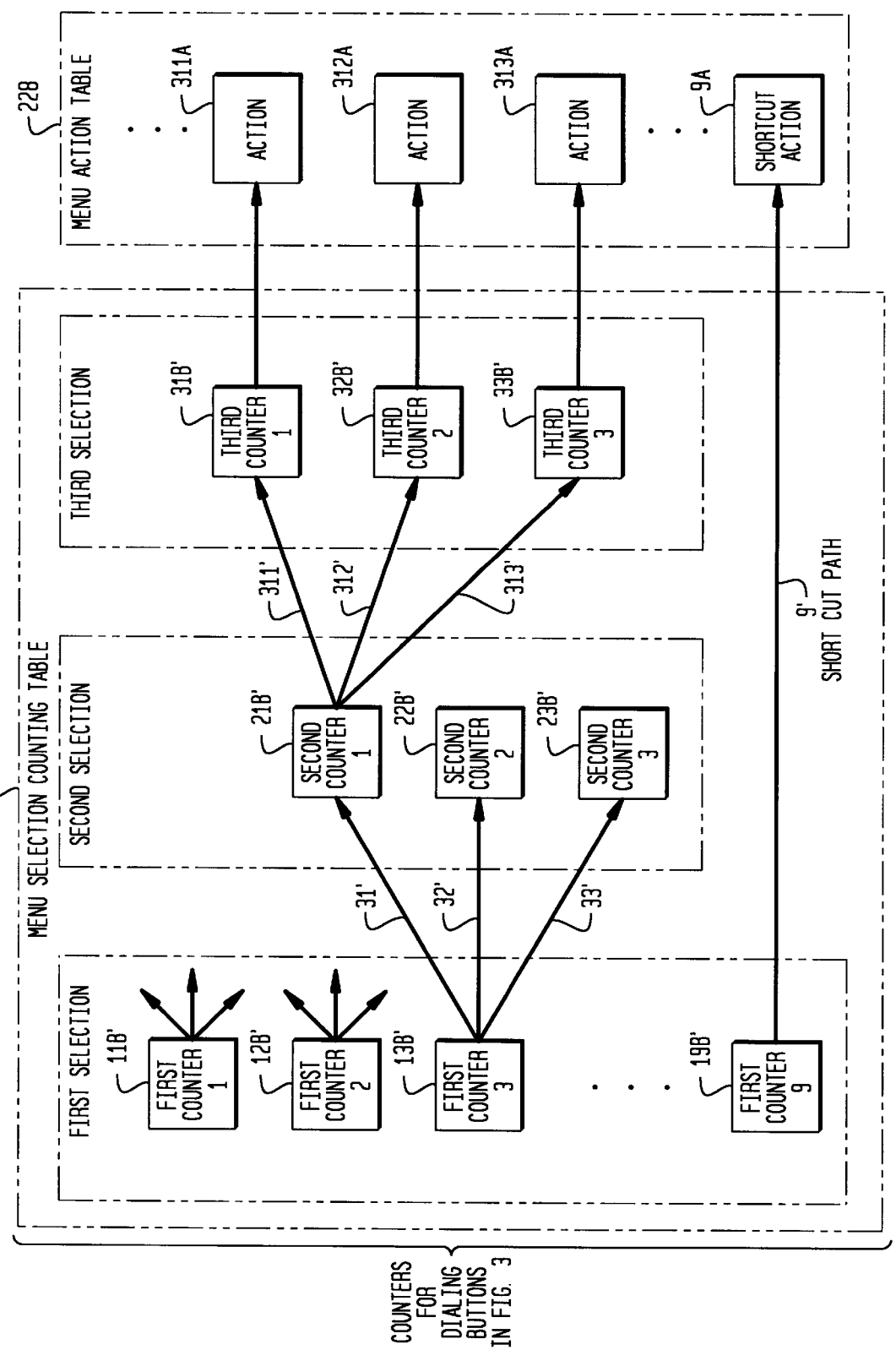
FIG. 9 illustrates are alternate embodiment of the invention, where counters are associated with path nodes of the voice menu.
Figure 10:
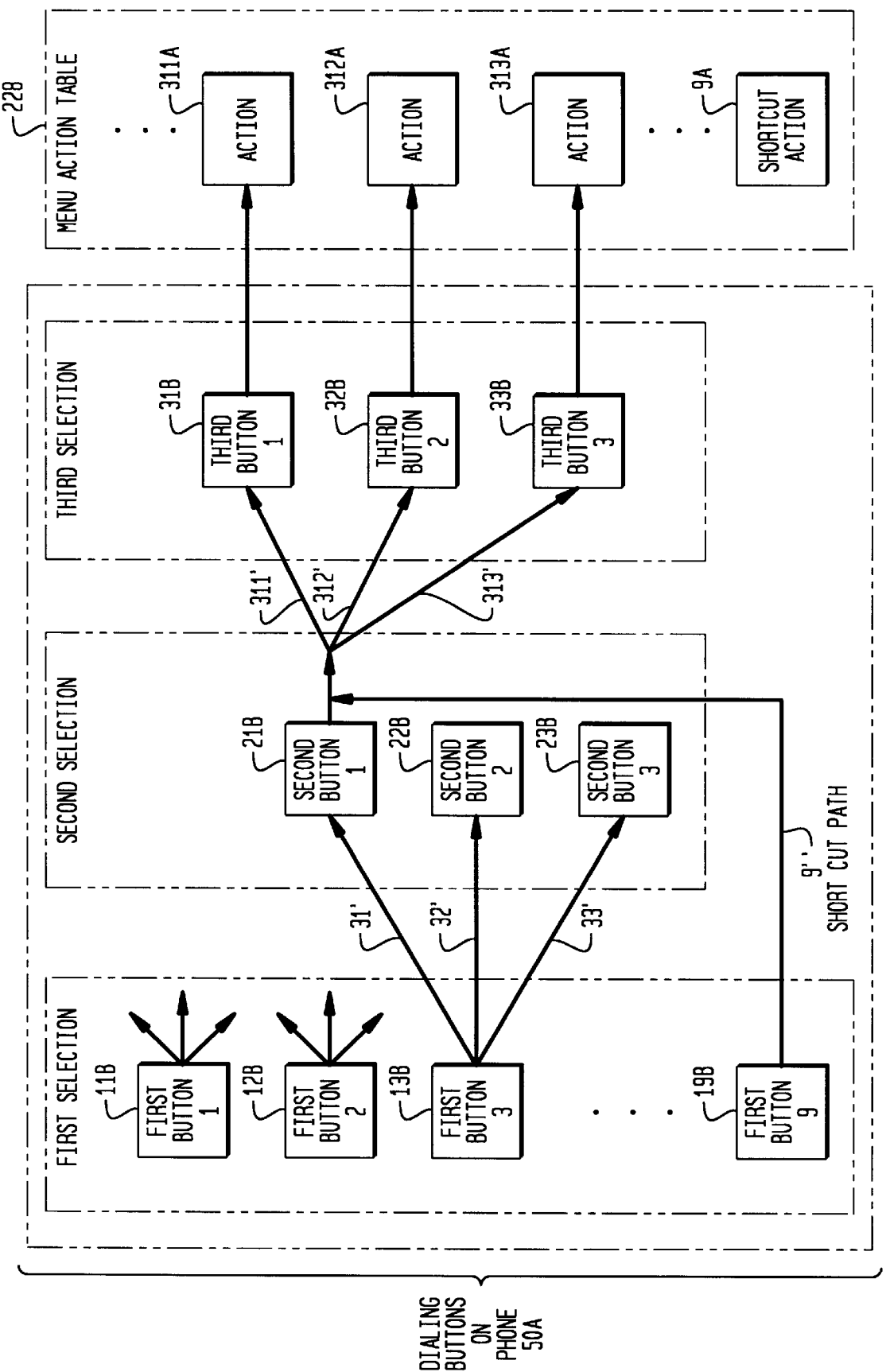
FIG. 10 illustrates the selection paths of FIG. 3, after operation of the alternate embodiment of the invention in FIG. 9.

In an alternate embodiment of the invention shown in FIGS. 9, 10, and 11 counters are associated with the path nodes of the voice menu to provide shortcut paths to frequently used intermediate nodes. FIG. 9 shows counters in the menu selection counting table 226 associated with the dialing buttons in FIG. 3. The counters in the menu selection counting table 226 are in the memory 202 of the control processor 102. For example, counter 21B' corresponds to the second button 1 identified as 21B in FIG. 3 and it counts how many times path 31' is traversed to button 21B. The voice prompts in a voice menu enable a caller to select sequences of plural dialing buttons to traverse desired paths in the voice menu. The alternate embodiment shown in FIGS. 9, 10, and 11 enables the system to adaptively substitute a single button sequence for a shortcut path. This is accomplished by accumulating counts in the counters shown in FIG. 9 for each of the respective corresponding buttons shown in FIG. 3. The counters in FIG. 9 enable the accumulation of counts for traversing each of the paths in the voice menu. For example, path 31' in FIG. 9 which begins at the button 13B and ends at button 21B, has the frequency that it is traversed established by the accumulated count in the counter 21B'. The path 311' from button 21B to button 31B has the frequency that it is traversed established by the counter 31B' in FIG. 9. The system accumulates counts for traversing each of the plurality of paths in the voice menu show in FIG. 9, each path beginning at an origin button and ending at a destination button. The system then ranks the accumulated counts as a weight value for the paths. The system then ranks the plurality of weight values and determines if any one of the weight values is greater than a threshold value, that maximum weight value corresponding to a maximum weighted path. The system then substitutes a shortcut path for the maximum weighted path. In FIG. 9, if it is determined by the accumulated count in the counter 21B' that the path 31' is used more frequently than other paths, then the path 31' will be maximum weighted path. In accordance with the invention, a single button shortcut path 9" shown in FIG. 10 can be substituted for the maximum weighted path. FIG. 10 shows that the button 9 labeled 19B is used as a shortcut button to establish shortcut path 9" around the two button sequence of button 13B and button 21B. If button 9 labeled 19B is selected by the caller, then the next menu will display messages corresponding to the path 311', 312', and 313'. This will circumvent the second selection using button 21B, thereby reducing a three button sequence into a two button sequence by virtue of the shortcut path 9". In this manner shortcut paths can lead to intermediate nodes in the voice menu. The objective is to minimize the weighted paths between the nodes in the voice menu. Techniques such as Huffman coding can be employed to minimize the weighted paths in the voice menu.

FIG. 11 is a flow diagram of the voice menu optimization program 224" of the alternate embodiment of the invention, corresponding to FIGS. 9 and 10. Step 402" accumulates a count for each path in menu selection counting table 226. Step 404" ranks each path by frequency of being traversed. Step 406" determines if all shortcut paths are ranked higher than remaining paths, then goto 408" else goto 410". Step 408" resets the counters in table 226 and return to accumulation step 402". In step 410", for the highest ranked path above a shortcut path, the program selects an existing shortcut path to change. Step 417" sends a notification to the system administrator via switch 116 suggesting the substitution of the highest ranked path for the selected shortcut path in menu action table 228. Step 419" receives and implements the change chosen by system administrator, updates tables 228 and 230, resets counters in table 226 and returns to accumulation step 402".

Although a particular embodiment of the invention has been disclosed, it will be understood by those with skill in the art that changes can be made to that specific embodiment without departing from the spirit and the scope of the invention.

What is claimed is:

1. In a communications system including a telephone having a plurality of dialing buttons and a voice response unit for providing voice prompts in a voice menu to a caller to select sequences of pluralities of the dialing buttons to achieve desired actions, including a shortcut message in the voice menu that prompts a caller to select a shortcut button to achieve a shortcut action, a method to automatically adaptively substitute a single button sequence for a selected action, comprising:

automatically accumulating counts with a voice menu optimization program, related to frequencies of occurrence of a plurality of actions prompted by said voice menu;

each of said plurality of actions being associated with a corresponding message in said voice menu that prompts a caller to select a button to achieve the action;

automatically ranking said plurality of actions with said voice menu optimization program, by their respective accumulated counts;

automatically determining with said voice menu optimization program, if any one of said plurality of actions has an accumulated count greater than an accumulated count of said shortcut action; and automatically substituting said one of said plurality of actions and a corresponding message for said shortcut action and said shortcut message in said voice menu in response to said determining step.

2. The method of claim 1, wherein said communications system is a telecommunications network.

3. The method of claim 1, wherein said communications system is a private branch exchange network.

4. The method of claim 1, wherein said communications system is a personal computer communications network.

5. The method of claim 1, which further comprises:

notifying a system administrator if any one of said plurality of actions has an accumulated count greater than an accumulated count of said shortcut action;

said system administrator substituting said one of said plurality of actions and a corresponding message for said shortcut action and said shortcut message in said voice menu.

6. The method of claim 1, which further comprises:

said step of substituting including concatenating a plurality of said corresponding messages for substitution as said shortcut message in said voice menu.

7. In a communications system including a telephone having a plurality of dialing buttons and a voice response unit for providing voice prompts in a voice menu to a caller to select sequences of pluralities of the dialing buttons to achieve desired actions, a system to adaptively substitute a single button sequence for a selected action, comprising:

a control processor coupled to the voice response unit, having a memory storing a shortcut message in a voice menu that prompts a caller to select a shortcut button to achieve a shortcut action;

a voice menu optimization program in the memory, executable by said control processor;

a counter in said control processor, accumulating counts related to frequencies of occurrence of a plurality of actions prompted by said voice menu, under control of said voice menu optimization program;

each of said plurality of actions being associated with a corresponding message in said voice menu that prompts a caller to select a button to achieve the action;

said voice menu optimization program in the memory, ranking said plurality of actions by their respective accumulated counts;

said voice menu optimization program determining if any one of said plurality of actions has an accumulated count greater than an accumulated count of said shortcut action; and said voice menu optimization program automatically causing substitution of said one of said plurality of actions and a corresponding message for said shortcut action and said shortcut message in said voice menu.

8. The system of claim 7, wherein said communications system is a telecommunications network.

9. The system of claim 7, wherein said communications system is a private branch exchange network.

10. The system of claim 7, wherein said communications system is a personal computer communications network.

11. The system of claim 7, which further comprises:

said control processor notifying a system administrator if any one of said plurality of actions has an accumulated count greater than an accumulated count of said shortcut action;

said system administrator substituting said one of said plurality of actions and a corresponding message for said shortcut action and said shortcut message in said voice menu.

12. The system of claim 7, which further comprises:

said voice menu optimization program concatenating a plurality of said corresponding messages for substitution as said shortcut message in said voice menu.

13. In a communications system including a telephone having a plurality of dialing buttons and a voice response unit for providing voice prompts in a voice menu to a caller to select sequences of plural dialing buttons to traverse desired paths in the voice menu, a method to automatically adaptively substitute a single button sequence as a shortcut path, comprising:

automatically accumulating counts of traversing each of a plurality of paths in said voice menu with a voice menu optimization program, each path beginning at an origin button and ending at a destination button;

automatically ranking said plurality of counts and determining if any one of said plurality of counts is greater than a threshold value, corresponding to a maximum weighted path with said voice menu optimization program; and automatically substituting a shortcut path for said maximum weighted path with said voice menu optimization program.

14. The method of claim 13, wherein said communications system is a telecommunications network.

15. The method of claim 13, wherein said communications system is a private branch exchange network.

16. The method of claim 13, wherein said communications system is a personal computer communications network.

17. The method of claim 13, which further comprises:

notifying a system administrator if said maximum weighted path has been identified;

said system administrator substituting said shortcut path and a corresponding shortcut message in said voice menu.

18. The method of claim 13, which further comprises:

said step of substituting including preparing a shortcut message in said voice menu.

19. In a communications system including a telephone having a plurality of dialing buttons and a voice response unit for providing voice prompts in a voice menu to a caller to select sequences of plural dialing buttons to traverse desired paths in the voice menu, a system to adaptively substitute a single button sequence as a shortcut path, comprising:

a control processor coupled to the voice response unit, having a memory storing a shortcut message in a voice menu that prompts a caller to select a shortcut button to achieve a shortcut path;

a voice menu optimization program in the memory, executable by said control processor;

a counter in said control processor, accumulating counts of traversing each of a plurality of paths in said voice menu, under control of said voice menu optimization program, each path beginning at an origin button and ending at a destination button;

said voice menu optimization program in the memory, ranking said plurality of counts and determining if any one of said plurality of counts is greater than a threshold value, corresponding to a maximum weighted path; and said voice menu optimization program automatically causing substitution of a shortcut path for said maximum weighted path.

20. The system of claim 19, wherein said communications system is a telecommunications network.

21. The system of claim 19, wherein said communications system is a private branch exchange network.

22. The system of claim 19, wherein said communications system is a personal computer communications network.

23. The system of claim 19, which further comprises:

said voice menu optimization program notifying a system administrator if said maximum weighted path has been identified;

said system administrator substituting said shortcut path and a corresponding shortcut message in said voice menu.

24. The system of claim 19, which further comprises:

said voice menu optimization program preparing a shortcut message in said voice menu.

* * * * *